April 2, 1929.  J. I. HAASE  1,707,804
KITCHEN UTENSIL
Filed Dec. 26, 1925

Inventor
Jorgen I. Haase
By Fred A. Lind
Attorney

Patented Apr. 2, 1929.

1,707,804

UNITED STATES PATENT OFFICE.

JORGEN I. HAASE, OF AKRON, OHIO.

KITCHEN UTENSIL.

Application filed December 26, 1925. Serial No. 77,676.

My invention relates to kitchen utensils, and it relates particularly to means for applying torque to the detachable covers of receptacles. More specifically my invention relates to a utensil adapted to be employed for removing or tightening jar lids, bottle tops and the like, which are secured to their associated receptacles by means of screw threads.

One object of my invention consists in providing a utensil of novel construction which is adapted to facilitate the application of torque to objects of any desired contour, and which lends itself readily to thorough cleansing.

Another object of my invention is to produce a kitchen utensil having no moving parts, which is adapted to clampingly engage a receptacle lid and to act as a lever in transmitting force thereto.

A still further object of my invention comprises providing a single piece kitchen utensil which is adapted to facilitate the tightening or removal of jar lids and which is adapted to clampingly engage lids of a great range of sizes to rotate the same, and which may be readily applied and readily removed therefrom.

Heretofore, it has been customary in the construction of jar lid removers or tightening devices, to employ a semi-flexible band of annular contour having both of its ends pivotally or otherwise secured to spaced pins mounted upon a handle. When no pressure was applied upon the handle, the band was of sufficiently large diameter to permit of being passed easily over the top of a jar lid. When the handle was moved, it pivoted about one of the pins, the other pin drawing the band tightly around the jar lid and enabling the operator to exert a considerable torque thereon. Another type of jar lid remover which has been extensively employed, consists of two oppositely disposed arcuate members connected together by means of a link pivoted thereto at each end, one of the arcuate members being provided with a rigidly attached handle. This device was of such diameter that it was too small to span the lid of an ordinary Mason jar. It was used by placing the free arcuate portion against one side of a jar lid and moving the handle, with its attached arcuate portion, as though to span the lid. The movement of the arcuate portion attached to the handle against the relatively inclined surface of the jar lid causes a clamping engagement therewith which permits of exerting considerable force against the lid to rotate it.

The aforementioned jar lid removers are adapted to be employed for removing circular lids of a limited range of diameters. Also as they employ moving parts, they are susceptible to rusting at the inaccessible portions of the joints, which is undesirable in kitchenware.

By invention I have avoided all of the aforementioned objections and disadvantages, and have substituted therefor a single piece rigid member which is simple and inexpensive to construct, strong and durable in operation, and which lends itself readily to thorough cleansing.

Briefly, my invention consists of a kitchen utensil composed of a single piece of sheet metal of substantially trapezoidal contour, having its inclined edges bent inwardly to form two oppositely disposed spaced relatively inclined edges, one of which is serrated and the other of which may be smooth.

For a more detailed description of my invention, reference may now be had to the accompanying drawings of an adaptation of my invention, of which:

Figure 1:
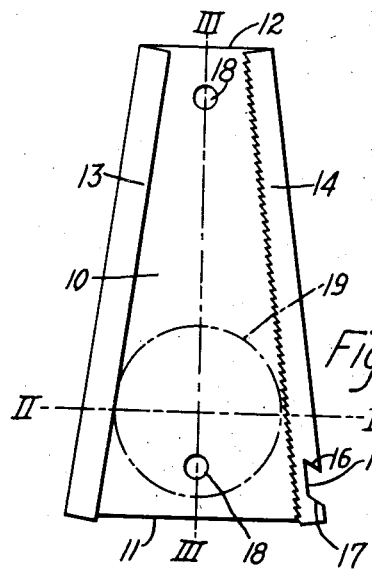
Fig. 1 is a bottom plan view of a utensil constructed in accordance with my invention.
Figure 3:
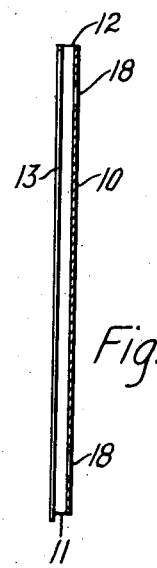
Fig. 3 is another cross-sectional view of the structure shown in Fig. 1, the section being taken along the line III—III thereof.
Figure 2:
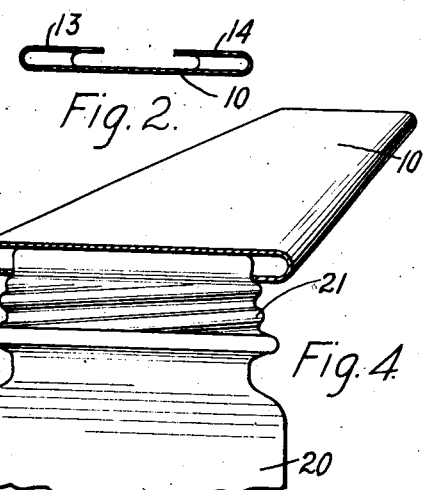
Fig. 2 is a cross-sectional view of the utensil illustrated in Fig. 1, the section being taken along the lines II—II thereof.

Referring now, particularly, to the structure shown in Figs. 1 to 3, inclusive, I have shown a single piece of sheet metal 10 of substantially trapezoidal contour, having a relatively long edge 11, an oppositely disposed relatively short substantially parallel edge 12, an inclined edge 13 and an oppositely disposed oppositely inclined edge 14. The main body portion 10 is substantially flat.

The inclined edge portions 13 and 14 are bent inwardly to a position parallel with the main body portion 10, but spaced therefrom. These bent edge portions, which are of substantially equal width throughout their length, are bent about a radius of curvature sufficiently great that any portion of the member 10 may be grasped and used as a handle without danger of injury from sharp edges or corners.

Figure 5:
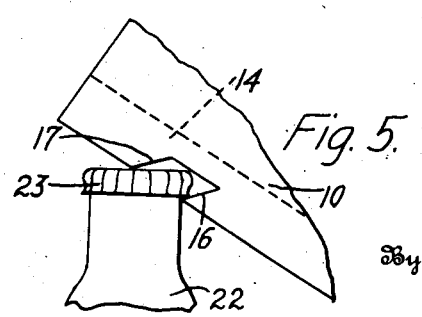
Fig. 5 is a fragmentary side elevational view of the device illustrated in Fig. 1, employed as a bottle opener.

The inwardly turned edge or flange 13 has a smooth edge. The oppositely inclined inwardly bent edge or flange 14 has a serrated edge, being provided with sharply pointed teeth which are inclined towards the converging ends of the edges 13 and 14. Adjacent the edge 14, at the point where the metal is bent, is a slot 15 provided with substantially parallel side walls 16 and 17, as shown in Figs. 1 and 5, for a purpose to be hereinafter described. The member 10 is also provided with two circular openings 18 centrally disposed adjacent the ends of the member. A dot and dash circle 19 indicates the position assumed by a jar lid with respect to the utensil when it is being employed to rotate the same.

Figure 4:
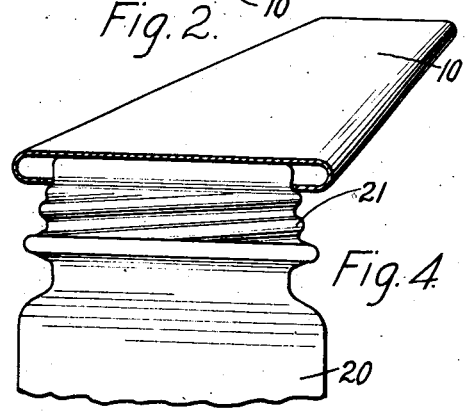
Fig. 4 is a view, partially in section and partially in perspective, of a utensil constructed in accordance with my invention as applied to a jar lid.

The operation of the device is as follows, assuming a jar of the Mason type, as indicated at 20 in Fig. 4, to have been filled with provisions to be canned. According to custom, a lid 21 is applied to the jar top and rotated by hand until friction with the commonly called jar gum becomes sufficiently great to render further rotation of the lid by hand difficult. My utensil is then applied by placing the bent edges down, placing the widest portion of the member in engagement with the top of the lid and sliding the utensil along the top so as to bring the narrow end closer to the lid until the two converging edges 13 and 14 engage the lid as shown in Fig. 4. The member 10, employing the smaller end as a lever and a handle, is then moved in a clockwise direction. When this occurs, the friction between the smooth side 13 and the jar lid is less than that between the lid and the serrated edge 14. As a result the edge 13 slides forwardly with respect to the jar lid, causing the lid to be clampingly engaged by the edges 13 and 14 and causing the teeth of the serrated edge 14 to dig into the metal of the jar lid. Movement between the edge 13 and the jar lid then stops, and by means of the teeth of the edge 14 the jar lid may be rotated until any desired pressure or position is produced.

When the lid has been tightened to the desired degree, the member 10 is moved in a counter-clockwise direction. When this occurs, the teeth of the edge 14 remain in substantially fixed contact with the jar lid and the smooth edge 13 slides with respect thereto. As it slides it removes the pressure causing the teeth of the edge 14 to clampingly engage the jar lid, thus permitting the removal of the device from the lid. As the friction between the smooth edge 13 and the jar lid is always less than that between the lid and the roughened edge, the counter-clockwise movement of the utensil does not break the seal produced by the clockwise movement. The circular openings 18 provide a means of hanging the utensil upon a nail, hook or the like in a convenient place in the kitchen.

In order to remove lids from jars, a similar device is employed, except that the left hand edge 13 is provided with sharply pointed teeth inclined towards the tapered end of the utensil, and the edge 14 is smooth. The principal of operation is identical with that described, except that the initial or operative movement is in a counter-clockwise direction.

It should be understood that the edges 13 and 14 are sufficiently close together adjacent the edge 12 that the tops of bottles, small jars and the like, which are held in threaded engagement with the top of their containers, may be removed thereby, and that any other lid, varying from the threaded bottle top to a size larger than an ordinary Mason jar lid, and of any outside contour, may be applied or removed by the use of a single device.

If it is desired to remove from a bottle a cap or lid which is of the clamped or crimped type, the utensil may be employed as illustrated in Fig. 5, in which is shown a bottle 22 provided with a crimped top 23. The top is removed by placing the edge 16 of the inclined slot 15 against the lower side of the cap and the edge 17 against the top of the cap, preferably adjacent the central portion thereof, and pulling upwardly upon the utensil, employing the utensil as a lever and the smaller end thereof as a handle.

Figure 6:
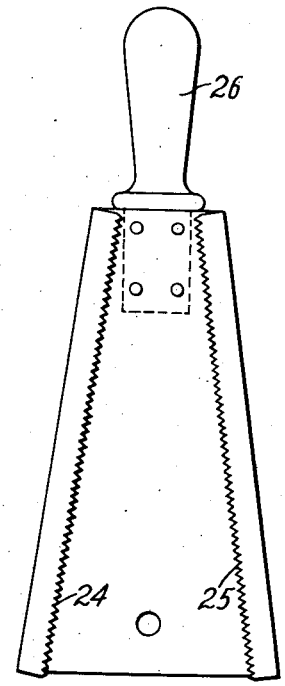
Fig. 6 is a bottom plan view of a modified form which my invention may assume.

Referring now to Fig. 6, I have illustrated a modified form of my invention in which a sheet metal member of similar form to that described in connection with Fig. 1, is provided with two oppositely inclined inwardly turned flanges 24 and 25, both of which are provided with serrated or sharp tooth edges. The main body portion of this utensil has riveted or otherwise secured thereto a handle 26 which serves to increase the leverage afforded by the utensil. The operation of this utensil is similar to that described in connection with the device illustrated in Fig. 1, except that, both edges being serrated, the friction between the jar lid and the several sides is the same, and a single device may be employed to both tighten and remove jar lids.

It should be understood that the member 10 is of sufficient thickness and rigidity that the edges 13 and 14 do not move apart materially when exerting a clamping action upon the jar lid, and that the metal is of sufficient hardness that the teeth of the edge 14 will remain sharp for a long period of time.

From the foregoing description it will be apparent that I have provided a utensil which is exceedingly simple in construction, inexpensive to manufacture, which lends itself readily to thorough cleansing and which has no moving parts to get out of order. It is so constructed that all portions thereof are plainly visible and any rusting which may occur is easily detected and is readily accessible for removal.

Although I have illustrated but two forms which my invention may assume, and have described in detail but a single application thereof, it will be readily apparent to those skilled in the art that it is not so limited but that various modifications and changes may be made therein without departing from the spirit of my invention or from the scope of the appended claims.

What I claim is:

1. A kitchen utensil comprising a single piece of sheet metal of substantially trapezoidal shape having its inclined edges bent inwardly towards each other, one of said edges being provided with a serrated surface.

2. A kitchen utensil comprising a rigid metal member provided with a main body portion and two substantially straight spaced oppositely angularly disposed surfaces disposed in a plane parallel to said main body portion, one of said surfaces being provided with a serrated edge.

3. A kitchen utensil comprising a rigid metal member provided with a main body portion and two spaced substantially straight oppositely angularly disposed surfaces disposed in a plane parallel to said main body portion, one of said surfaces being provided with a serrated edge composed of a plurality of pointed teeth inclined towards the converging ends of said surfaces.

4. A kitchen utensil comprising a single piece sheet metal member having its edges bent inwardly in spaced relation thereto and extending towards each other and disposed in angular relation to each other, one of said edges being provided with a relatively smooth edge and the opposite edge being provided with a serrated edge.

5. A kitchen utensil comprising a single piece sheet metal member of substantially trapezoidal contour having its inclined edges bent inwardly towards each other into spaced angular relation, one of said edges being provided with a relatively smooth surface and the other edge being provided with sharp pointed teeth, the radius of curvature of said edges being sufficiently large to prevent the formation of sharp edges thereto to permit of using the ends of said member as a handle.

In witness whereof, I have hereunto signed my name.

JORGEN I. HAASE.